(12) United States Patent
Godwin

(10) Patent No.: US 6,220,820 B1
(45) Date of Patent: Apr. 24, 2001

(54) BEARING PRELOAD

(75) Inventor: John Howard Godwin, Winchcombe (GB)

(73) Assignee: Dowty Aerospace Gloucester Limited, Gloucester (GB)

(*) Notice: Subject to any disclaimer, the term of this patent is extended or adjusted under 35 U.S.C. 154(b) by 0 days.

(21) Appl. No.: 08/981,684

(22) PCT Filed: Aug. 8, 1996

(86) PCT No.: PCT/GB96/01922

§ 371 Date: May 11, 1998

§ 102(e) Date: May 11, 1998

(87) PCT Pub. No.: WO97/06056

PCT Pub. Date: Feb. 20, 1997

(30) Foreign Application Priority Data

Aug. 9, 1995 (GB) ................................ 9516302

(51) Int. Cl.[7] .................................... B64C 11/06
(52) U.S. Cl. .................... 416/205; 416/207; 416/209; 416/220 A; 416/1; 384/556
(58) Field of Search .................... 416/205, 206, 416/207, 208, 209, 219 A, 220 A, 147, 1; 384/556 R

(56) References Cited

U.S. PATENT DOCUMENTS

| | | |
|---|---|---|
| 3,558,199 | 1/1971 | Raiser et al. . |
| 4,551,032 * | 11/1985 | Mottershead ................ 384/556 |
| 4,611,351 * | 9/1986 | Nakamura ................ 384/556 |
| 4,611,934 * | 9/1986 | Piotrowski et al. ................ 384/556 |
| 5,415,527 * | 5/1995 | Godwin ................ 416/205 |

FOREIGN PATENT DOCUMENTS

| | | |
|---|---|---|
| 1579285 | 8/1969 | (FR) . |
| 2585422 | 1/1987 | (FR) . |
| 2244525 | 12/1991 | (GB) . |
| 2271392 | 4/1994 | (GB) . |

* cited by examiner

*Primary Examiner*—Edward K. Look
*Assistant Examiner*—Richard Woo
(74) *Attorney, Agent, or Firm*—Baker Botts L.L.P.

(57) ABSTRACT

A bearing arrangement, for example, for a variable pitch propeller, has a fluid operated actuator (42, 34, 40) for causing relative movement between bearing surfaces of races (12, 32) so as to preload bearings (30) held therebetween. Mechanical locking means (34, 36, 38) is provided to maintain the bearings under preload when the fluid pressure is released from the actuator.

15 Claims, 1 Drawing Sheet

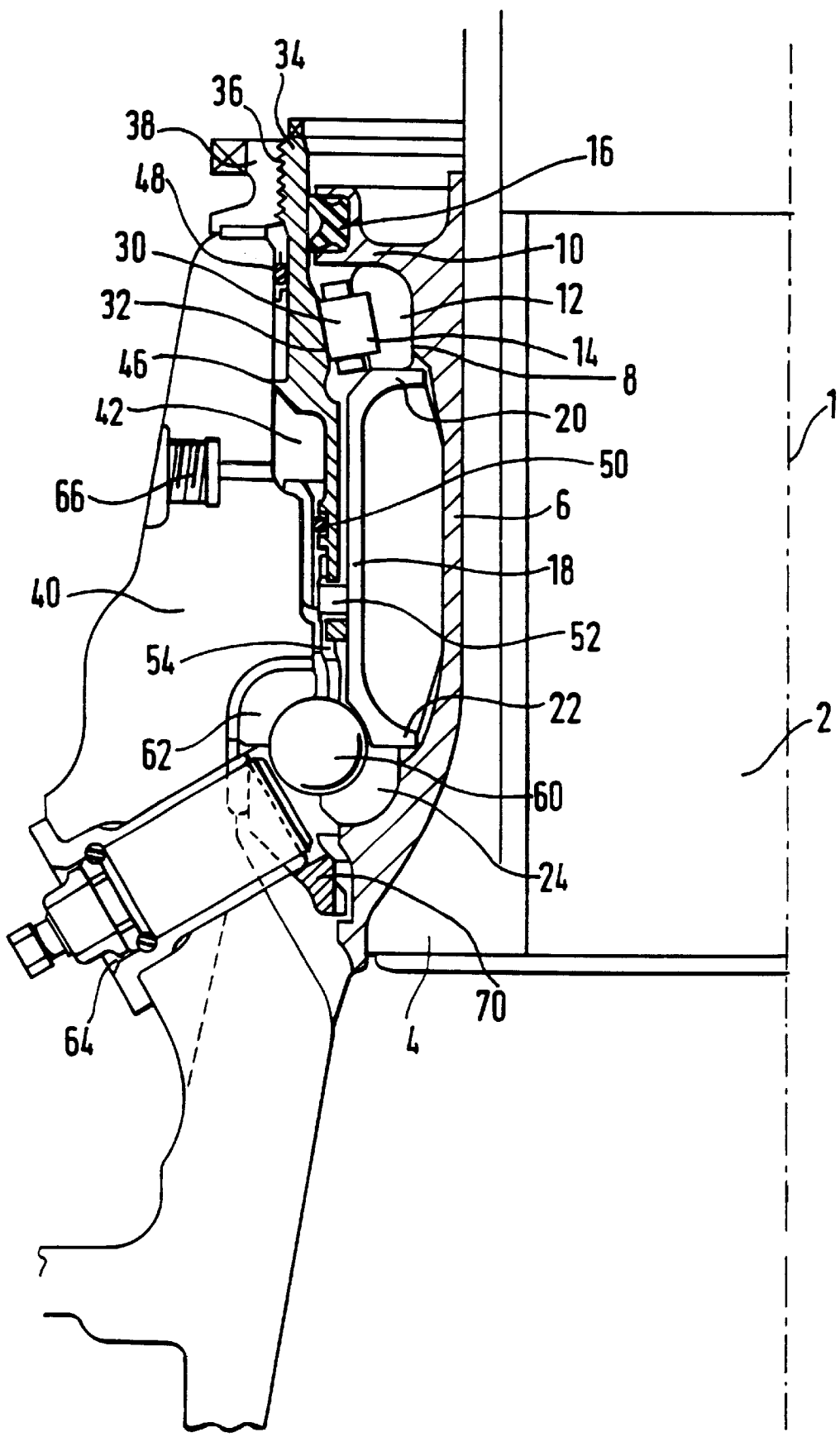

BEARING PRELOAD

BACKGROUND OF THE INVENTION

1. Field of the Invention

The present invention relates to a bearing with a preload arrangement, and a method of preloading a bearing, especially a variable pitch propeller bearing.

2. Description of the Related Art

The increase in the power handling characteristics and diameters of propeller systems makes it increasingly necessary to preload the bearings within the propeller hub which allow the propeller blades to change pitch. The preload serves many purposes, the primary one of which is to ensure that all of the bearing elements are kept stable during all flight conditions. Preloading also serves to align the blade root within the propeller hub and, in applications having removable blades, also provides a means for locking the blades into the hub.

A known propeller blade root assembly typically comprises a split upper inner race which faces radially outward of the propeller blade and is inclined with respect to the axis of the blade so as to face slightly towards the propeller root. An outer bearing race is disposed generally radially outwards of the inner bearing race and has an inwardly facing bearing surface which is slightly inclined so as to be generally parallel to the bearing surface of the inner bearing race. Motion of the outer bearing race along the axis of the propeller varies the distance between the bearing surfaces of the inner and outer bearing races and this feature is exploited to preload the bearings. The outer bearing race has an outwardly facing screw thread located thereon which cooperates with a preload nut which is wound down to bear against the hub, either directly or indirectly (to prevent fretting). The winding down of the nut causes the outer bearing race to be moved axially of the propeller blade and to preload the propeller blade bearings. The preload is applied via a spanner acting on the nut and considerable effort may be required. The friction between the nut, the thread, and the hub makes it difficult to determine the torque required to obtain a desired preload. This often necessitates the performing of tests in order to determine what preload had been achieved.

SUMMARY OF THE INVENTION

According to a first aspect of the present invention, there is provided a bearing having a preload arrangement for preloading the bearing, comprising a first member having a first bearing surface movable with respect to a second member having a second bearing surface so as to bear against at least one bearing located between the first and second bearing surfaces, a fluid operated actuator for urging the first member to move with respect to the second member so as to apply a load to the bearing, and mechanical locking means for locking the first member against return movement.

It is thus possible to apply a preload to a bearing without relying solely on the force applied by rotation of a preload nut. The preload force may be more easily applied and accurately controlled than is the case with the known arrangement described hereinbefore.

Once the preload has been applied using the fluid actuator, the mechanical locking means is operated so as to lock the first member in position such that the bearings remain preloaded when fluid pressure is removed from the actuator.

The fluid operated actuator may advantageously be used to apply a force to preload the bearing during assembly or maintenance of a device incorporating the bearing.

Advantageously, the first member is moved in a first direction to apply a load to a bearing and further comprises, or cooperates with, the locking means for preventing motion of the first member in a return direction opposing the first direction. The locking means may comprise a threaded portion located on the first member which, in use, cooperates with a retaining nut which bears directly or indirectly against a fixed surface.

Advantageously, the first member cooperates with a third member to define a chamber and the first member has a third surface which forms a movable wall of the chamber, such that fluid pressure within the chamber exerts a force against the third wall and thereby urges the first member to move along the first direction. Advantageously, the fixed surface is a surface of the third member. Thus, the fluid operated actuator is formed between the first member and the third member which are moved apart by fluid pressure applied therebetween, and between which the locking means cooperates to hold them apart.

Preferably, the bearing is part of a bearing arrangement having third and fourth bearing surfaces arranged to engage bearings therebetween, and one of the third and fourth surfaces is movable in response to relative movement of the first member such that the bearings between these surfaces also become preloaded when the actuator is operated.

The third member is associated with one of the third and fourth surfaces and serves to store a preload reaction force between the bearings of the first and second surfaces and the third and fourth surfaces.

Preferably, the bearing arrangement is provided at the fixing region of a propeller blade.

Preferably, the first bearing surface is coaxial with and outwardly radially disposed of the second bearing surface, the first and second bearing surfaces being substantially parallel with one another and inclined with respect to their common axis (i.e. the surfaces are portions on a conic surface having the same or substantially the same cone angles) such that longitudinal motion of the first member with respect to the second member changes the clearance between the first and second bearing surfaces. The fixing region of the propeller blade also has a third bearing surface which faces radially outwardly and away from the base of the propeller blade root and cooperates with an opposing fourth bearing surface to retain bearings therebetween. Operation of the actuator preloads the bearings between the first and second bearing surfaces, and in so doing, causes the blade root to move so as to preload the bearings between the third and fourth bearing surfaces, and also places the blade root portion intermediate the bearings under tension.

Thus, when the fluid pressure is released from the actuator, the tension stored in the blade root maintains the preload on all the bearings.

Preferably, the first member is substantially cylindrical and is arranged to fit within a corresponding recess within a housing.

Preferably, the first member is arranged to engage within a corresponding recess within a propeller hub so as to hold the propeller against wobble about its own axis.

According to a second aspect of the present invention, there is provided a preload arrangement for a propeller blade, comprising a member movable in response to fluid pressure acting on a surface thereof so as to preload the bearings of the propeller blade.

According to a third aspect of the present invention, there is provided a method of preloading a bearing having a preload arrangement, the preload arrangement comprising a first member having a first bearing surface movable with respect to a second member having a second bearing surface so as to bear against at least one bearing between the first and second bearing surfaces, a fluid operated actuator for urging the first member to move with respect to the second member so as to apply a load to the bearing, and mechanical locking means for locking the first member against return movement, the method comprising the steps of: applying fluid pressure to the fluid operated actuator; and operating the locking means to lock the first member against return movement.

Advantageously, the fluid pressure is removed after the locking means has been operated.

BRIEF DESCRIPTION OF THE DRAWING

FIG. 1 A cross-sectional view of a propeller blade root constituting an embodiment of the present invention.

DETAILED DESCRIPTION OF THE INVENTION

The present invention will further be described, by way of example, with reference to the accompanying drawing which is a cross-section through a propeller blade root constituting an embodiment of the present invention.

The accompanying figure shows a propeller blade root and bearing assembly in cross-section. The rotational axis of the propeller blade is represented by chain dot line 1. A propeller blade root 2 has a generally cylindrical form which tapers towards a region of increased diameter 4 located at the end thereof. The propeller blade root 2 carries a blade root outer sleeve 6 which can, when viewed as shown in the FIGURE, be regarded as being divided into upper and lower portions. The upper portion of the blade root outer sleeve 6 has a radially outward facing surface 8 bounded at an upper edge thereof by an outwardly extending flange 10. The surface 8 and flange 10 cooperate to define a seat for a split upper inner bearing race 12. The bearing race 12 has an outwardly facing bearing surface 14 which is inclined with respect to the axis of the propeller such that the radius at the uppermost edge of the bearing surface 14 is greater than the radius at the lower-most edge. The flange 10 carries an outwardly facing "U" shaped recess which carries as blade root seal 16.

The upper inner bearing race 12 is held in place by a split spacer 18 having a shallow "U" shaped cross-section positioned around the blade root such that a first rim 20 of the spacer 18 bears against the bearing race 12 and a second rim 22 of the spacer 18 bears against a lower split inner bearing race 24.

Upper roller bearings 30 are located between the surface 14 and an upper outer bearing race 32 which is carried on a sleeve 34. The upper outer bearing race 32 is parallel to the upper inner bearing race 14, and the sleeve 34 is axially slidable with respect to the propeller so as to vary the distance between the opposing surfaces of the upper bearing races.

The sleeve 34 carries, at an upper end thereof, a threaded portion 36 which cooperates with a locking nut 38.

The sleeve 34 fits within a recess formed in the propeller hub 40. The sleeve 34 and the walls of the recess within the propeller hub 40 cooperate to define an annular chamber 42. The sleeve 34 and propeller hub 40 are profiled such that the sleeve 34 effectively forms a piston within a cylinder defined in the propeller hub 40 such that the introduction of fluid pressure into the chamber 42 urges the sleeve 34 to move outwardly of the propeller hub 40, i.e. in an upward direction as shown in the figure.

The sleeve 34 has a radially outwardly extending lip 46 which, in use, bears against the walls of the recess and prevents wobbling of the sleeve within the recess. Ring seals 48 and 50 are provided above and below the chamber 42 so as to prevent leakage of fluid therefrom. A lower end of the sleeve 34 carries pins 52. A ball rake 54 engages the pins 52 and extends towards the split lower inner bearing race 24. In use, ball bearings 60 are held between the inner lower bearing surface 24 and an outer lower bearing surface 62 which is attached to the propeller hub 40. A closeable delivery hole 64 provides a route through which the ball bearings 60 may be inserted into the space between the races 24 and 62.

A fluid delivery passage 66 extends from the periphery of the propeller hub 40 to the annular chamber 42. The delivery passage 66 has a threaded end portion such that a delivery hose or similar may be attached thereto in order to deliver fluid at pressure into the chamber 42.

In order to assemble the arrangement, the split upper bearing race 12 is fitted on to the blade root outer sleeve 6. The blade root seal 16 is then fitted into its holding groove on the blade root outer sleeve. The split spacer 18 is positioned so as to retain the upper inner bearing race 12, and then the upper rollers 30 are positioned on the race 12. Following this, the sleeve 34 is fitted over the rollers 30 so as to keep them in position. The ball rake 54 is then clipped on to the sleeve 34 via the pins 52. The lower split inner race 24 is then located into its recess on the blade root outer sleeve 18. The split spacer 6 also serves to retain the lower race 24 in position. The propeller blade root assembly is now complete.

In order to position the propeller blade within the propeller hub 40, the root assembly is passed through a blade port (i.e. the open top of the recess) within the propeller hub until the blade root outer sleeve 6 rests against a secondary retention ring 70. The ball bearings 60 are then passed through the delivery hole 64 into the space between the lower outer race 62 and the split lower inner race 24. Once the ball bearings 60 are in position, the delivery port 64 is closed and fluid pressure, for example, from a pneumatic source, is applied to the chamber 42 via the delivery passage 66. The fluid pressure urges the sleeve 34 to move upwardly and thereby to preload the bearings 30 and 60. The locking nut 38 is then tightened to a nominal torque so as to bear against the upper end of the hub 40 and thereby to prevent motion of the sleeve 34 in a downwardly direction as shown in the figure. The chamber 42 is then depressurised and the delivery passage 66 is closed to prevent the ingress of dirt. The bearing assembly is now preloaded.

It is thus possible to provide a bearing assembly, suited for use with variable pitch propellers, which allows the bearing preload to be easily implemented and relatively well controlled.

What is claimed is:

1. A bearing arrangement for holding a blade root of a propeller blade within a propeller hub, the bearing arrangement adapted to engage with the fixing region of the propeller blade and having a preload arrangement for preloading a bearing, comprising a first member having a first bearing surface movable with respect to a second member having a second bearing surface so as to bear against at least one bearing located between the first and second bearing surfaces, characterized by a fluid operated actuator for urging the first member to move with respect to the second member so as to apply a load to the at least one bearing, and a mechanical locking arrangement comprising a threaded portion located on the first member and retaining nut which engages the threaded portion and which, in use, bears against a fixed surface thereby locking the first member against return movement.

2. A bearing arrangement claimed in claim 1, characterized in that in use, once a preload has been applied via the fluid actuator, the mechanical locking arrangement is operated so as to lock the first member in position such that the bearings remain preloaded when fluid pressure is removed from the actuator.

3. A bearing arrangement as claimed in claim 1, characterized in that the first member is moved in a first direction to apply a load to the at least one bearing and the mechanical locking arrangement prevents motion of the first member in a return direction opposing the first direction.

4. A bearing arrangement as claimed in claim 1, characterized by a third member, the first and third members cooperating to define a chamber and the first member having a wall surface which forms a moveable wall of the chamber, such that fluid pressure within the chamber exerts a force against the wall surface and thereby urges the first member to move along the first direction.

5. A bearing arrangement as claimed in claim 4, characterized in that the third member has a fixed surface against which the mechanical locking arrangement bears.

6. A bearing arrangement as claimed in claim 4 and characterized by further comprising third and fourth bearing surfaces arranged to engage bearings there between, and in which one of the third and fourth bearing surfaces is movable in response to the relative movement of the first member such that the bearings between the third and fourth bearing surfaces become preloaded when the actuator is operated in which the third member is associated with one of the third and fourth surfaces and serves to store a preload reaction force between the bearings associated with the first and second surfaces and the bearings associated with the third and fourth surfaces.

7. A bearing arrangement as claimed in claim 1, characterized in that the first bearing surface is substantially coaxial with and outwardly radially disposed of the second bearing surface, the first and second bearing surfaces being substantially defined by respective conic surfaces having substantially the same cone angle with respect to the common axis, such that longitudinal motion of the first member with respect to the second member changes the clearance between the first and second bearing surfaces.

8. A bearing arrangement as claimed in claim 1, characterized by further comprising third and fourth bearing surfaces arranged to engage bearings there between, and in which one of the third and fourth bearing surfaces is movable in response to the relative movement of the first member such that the bearings between the third and fourth bearing surfaces become preloaded when the actuator is operated.

9. A propeller blade as claimed in claim 1, in which tension stored in the blade root maintains the bearings in a preloaded state.

10. A propeller blade as claimed in claim 1, in which the first member is arranged to engage with a recess within the propeller hub so as to hold the propeller against wobble about its own axis.

11. A bearing arrangement as claimed in claim 1, wherein the retaining nut bears directly against the fixed surface thereby locking the first member against return movement.

12. A bearing arrangement as claimed in claim 1, wherein the retaining nut bears indirectly against the fixed surface thereby locking the first member against return movement.

13. A method of preloading a bearing arrangement for a blade root of a propeller blade within a propeller hub, the bearing arrangement being adapted to engage with the fixing region of the propeller blade and having a preload arrangement, the preload arrangement comprising a first member having a first bearing surface movable with respect to a second member having a second hearing surface so as to bear against at least one bearing between the first and second bearing surfaces so as to apply a load to the at least one bearing, a fluid operated actuator for urging the first member to move with respect to the second member so as to apply a load to the at least one bearing and a mechanical locking device comprising a threaded portion located on the first member and a retaining nut which engages the threaded portion and which, in use, bears against a fixed surface, thereby locking the first member against return movement, the method comprising the steps of applying a fluid pressure to the fluid operated actuator, and operating the locking device to lock the first member against return movement.

14. A method of preloading a bearing for a root of a propeller blade within a hub as claimed in claim 13, wherein the retaining nut bears directly against the fixed surface thereby locking the first member against return movement.

15. A method of preloading a bearing for a root of a propeller blade within a hub as claimed in claim 13, wherein the retaining nut bears indirectly against the fixed surface thereby locking the first member against return movement.

* * * * *